United States Patent [19]

Modney et al.

[11] 4,204,733

[45] May 27, 1980

[54] FILM POSITIONING APPARATUS

[75] Inventors: William Modney; Norman J. Rosenburgh, both of Rochester, N.Y.

[73] Assignee: Eastman Kodak Company, Rochester, N.Y.

[21] Appl. No.: 931,351

[22] Filed: Aug. 7, 1978

[51] Int. Cl.$^2$ .................. G03B 27/32; G03B 27/76; G03B 27/64

[52] U.S. Cl. .................. 355/64; 355/71; 355/76

[58] Field of Search .............. 355/18, 50, 64, 67, 355/72–77, 40, 71, 98, 99; 274/10 E, 10 S, 40

[56] References Cited

U.S. PATENT DOCUMENTS

| | | | |
|---|---|---|---|
| 634,025 | 10/1899 | Robinson | 274/40 X |
| 1,794,279 | 2/1931 | Daugé | 355/40 |
| 2,443,281 | 6/1948 | Terry | 355/64 X |
| 2,494,495 | 1/1950 | Tait et al. | 355/72 X |
| 2,911,884 | 11/1959 | Caudle et al. | 355/40 UX |
| 2,933,030 | 4/1960 | Bornemann | 355/99 |
| 3,073,214 | 1/1963 | Haviland | 355/75 |
| 3,094,036 | 6/1963 | Benson | 355/40 UX |
| 3,292,485 | 12/1966 | Mey | 355/18 |
| 3,418,042 | 12/1968 | Sigl | 355/76 X |
| 4,027,968 | 6/1977 | Spence-Bate | 355/71 X |
| 4,056,321 | 11/1977 | Gensike et al. | 355/99 |

FOREIGN PATENT DOCUMENTS 219555 3/1910 Fed. Rep. of Germany ........ 274/10 E

Primary Examiner—Donald A. Griffin
Attorney, Agent, or Firm—D. M. Woods

[57] ABSTRACT

Film positioning apparatus is provided for supporting and positioning a disk-shaped film unit, having a plurality of image frames, in several spaced positions on a photographic printer, including one position where the film unit is supported adjacent the printing gate aperture. The apparatus includes a positioner which moves the film unit to each position. The supported film unit is moved independently of the positioner at the printing gate aperture and at other positions where such independent movement is desired to position selected frames for utilization.

11 Claims, 7 Drawing Figures

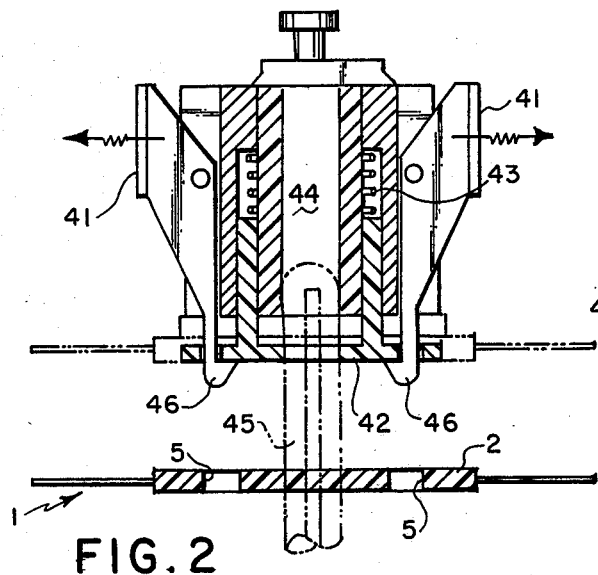
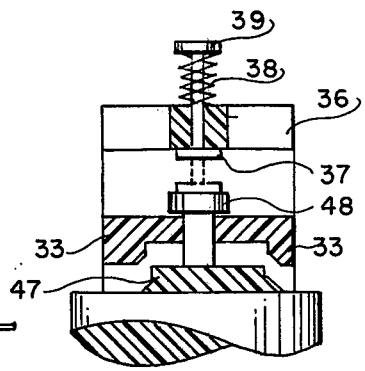
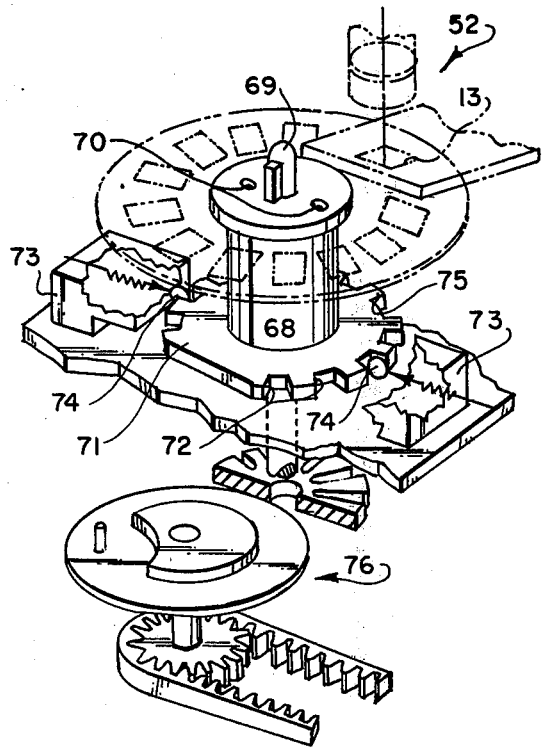
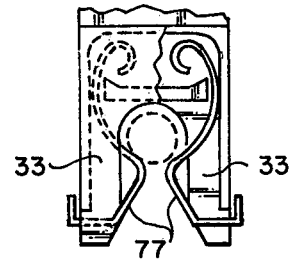
FIG. 2
FIG. 3
FIG. 4
FIG. 5

FILM POSITIONING APPARATUS

BACKGROUND OF THE INVENTION

1. Field of the Invention

The invention generally relates to apparatus for positioning a plurality of information-containing photographic film units in apparatus intended for utilizing or processing the information. The invention is particularly useful with apparatus that utilizes a plurality of image frames disposed on each photographic unit. More particularly, the invention relates to apparatus for positioning film units in a photographic printer.

2. Description Relative to the Prior Art

Apparatus in accordance with the invention has particular utility when used to position disk-shaped film units in a photographic printer. The disadvantages and limitations of certain prior art devices are generally discussed in U.S. patent application Ser. No. 931,350 in the names of R. Gentile, R. G. Hurlbut, J. C. Clifton and J. L. King, filed concurrently with and assigned to the same assignee as the present application. The apparatus disclosed in such application overcomes some of those disadvantages and limitations. More specifically apparatus is disclosed in such application for supporting and positioning a disk-shaped film unit including a plurality of image frames, in several spaced positions on the printer. In one of these positions the film unit is supported adjacent the printing gate aperture while in another position, the film unit is supported for classification of the image frames. When positioned adjacent the printing gate aperture, the supported film unit is rotationally indexed to position selected frames in the printing gate aperture. Efficiency is realized becasue the apparatus allows classification, and loading or unloading, or one film unit simultaneously with the printing exposure, based on prior classification, of another film unit.

The apparatus described in copending application Ser. No. 931,350 includes a rotatable turret on which separate but substantially identical indexers were mounted for each film unit carried by the turret. If the spaced positions are few and rotation of the film unit relative to the turret is required at each position, the apparatus is appropriate. But as more positions are involved, and rotation is not required at each, the turret involves unnecessary duplication of parts and complexity.

The apparatus disclosed and claimed in the present application avoids such duplication of parts and complexity and is more suitable for high volume automated operations where it is desired to have as many functions as possible performed on such a turret.

SUMMARY OF THE INVENTION

In accordance with the invention, apparatus is provided for supporting a film unit, having multiple images, in a plurality of spaced work positions relative to a plurality of work stations. Indexing apparatus is located in at least one of the work stations for positioning selected image frames with respect to functional apparatus. The indexing device is separate from the supporting apparatus for the film unit and the film element is releasably retained by the supporting apparatus whereby the indexing device is able to move the unit independently of the supporting apparatus. Additional film unit indexing devices may be provided at those work stations where movement of the film unit independently of the supporting means is desired to accomplish the work to be performed at such stations.

In the disclosed embodiment apparatus in accordance with the invention is incorporated in a photographic printer. The supporting apparatus is arranged to sequentially position a disk-shaped film unit in a plurality of positions relative to work stations where functions such as loading, viewing, cleaning, printing and unloading are performed.

BRIEF DESCRIPTION OF THE DRAWINGS a preferred embodiment of the invention will be described with reference to the drawings, wherein:

FIG. 2 is a cross sectional view of a picker device used for grasping and holding a film unit in the printer;

FIG. 3 is a sectional view illustrating apparatus for magnetically attracting the picker device to the arm of a film unit positioner;

FIG. 4 is a plan view of one arm of the positioner illustrating a mechanism for holding the film unit picker in place;

FIG. 5 is a perspective view of one embodiment of a mechanism for rotating the film unit in the printing gate aperture of the printer;

DETAILED DESCRIPTION OF THE INVENTION

Image frames on a photographic unit may be utilized in numerous ways without affecting the structure of the photographic unit. For example, in the case of microfilm images, the image is typically in the form of a reduced document. This document image may, for example, be illuminated and projected upon a screen for viewing. Alternatively the image may be illuminated and projected upon a copy plane in which copy material is exposed for making duplicate copies. In other applications, an image frame may be scanned by a flying spot scanner to sense density variations. Electrical impulses corresponding to these variations may be processed through conventional electronic circuits and drive a display device, such as a cathode ray tube, for recreating the image represented on the frame. Film positioning apparatus in accordance with the present invention may be used to position a film unit, and individual image frames on the unit, for these various purposes and the disclosure of a preferred embodiment in connection with a photographic printer is not to be considered a limitation on the scope of the invention.

Because photographic printers in general are well known, as are other types of copying machines, the present description will be directed in particular to elements forming part of, or cooperating more directly with, the present invention. Elements not specifically shown or described may take various forms well known to those skilled in the art.

Also, the disclosed embodiment primarily concerns the positioning of a film unit in and adjacent to the printer gate aperture. A film unit used in this manner is typically a photographic negative transparency, although a positive transparency or a reflection print can be considered to be equivalent to negatives for purposes of the disclosed embodiment. In the case of a reflection print the illumination system would be different from that designed for transparencies, but these changes are within the capability of those skilled in the art.

Figure 6:
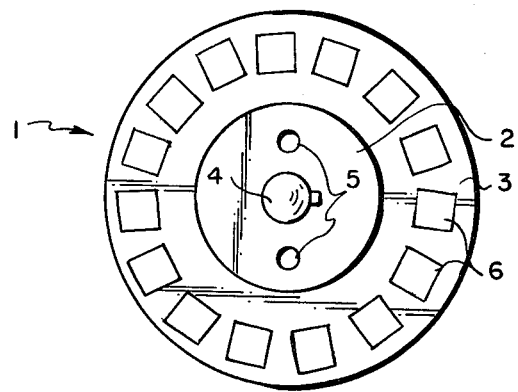
FIG. 6 is a plan view of the film unit positioned by the disclosed embodiment.

Furthermore, the disclosed embodiment is described in relation to a disk-shaped film unit having a plurality of image frames (See FIG. 6). Such a film unit includes a hub, or core, 2 and a film disk 3 carried by the hub 2. A spindle aperture 4 is located in the center of the hub 2 and a pair of alignment holes 5 are located in the hub 2 on opposite sides of spindle aperture 4. The film disk 3 includes a plurality of image frames 6 disposed around the hub in a generally circular pattern.

The disclosed embodiment is particularly useful where various activities occur relative to the film unit while it is supported by the printer. These activities include such representative functions as loading the film unit upon the printer, classifying each negative frame for density and/or color correction, removing dust from the film unit, printing individual frames from the unit and unloading the film unit from the positioner. However some of these functions may be spatially combined, such as loading and classifying, so that several of these functions may occur at one location.

Figure 7:
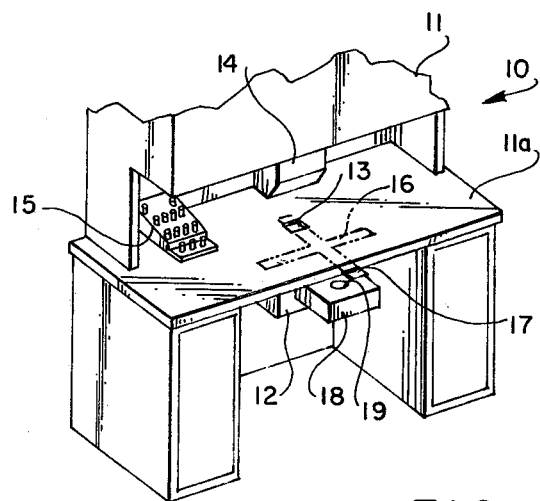
FIG. 7 is a perspective view of a known photographic printer for use with the disclosed embodiment of the invention.

Referring now to FIG. 7, there is shown in perspective a view of a film positioning apparatus in accordance with the present invention detachably positioned upon a photographic color printer 10 which can for example take the form of a Kodak Model 5S-5 printer. The printer 10 may be equipped with roll paper supply and take-up magazines and apparatus for advancing a roll of photosensitive photographic print material from the supply magazine through the exposure station of the photographic printer to the take-up magazine, all such components being enclosed in a light-tight cabinet 11. The printer is also equipped with an exposure lamphouse 12 located beneath the work table 11a of the printer and operative to project printing light through a negative positioned in a printing aperture 13. The printing light beam directed through the photographic negative is projected by projection lens encased in a lens assembly housing 14 onto the photosensitive photographic print material located in the print exposure station within the light-tight cabinet 11.

Three subtractive primary color filters may be located within the housing 14 and are operative, in conjunction with associated exposure control circuits, to control exposure of the photosensitive print material to light of the three respective primary colors passing through the negative. These color exposures are terminated after respective time periods dependent upon the intensities of such primary colors of light detected by three respective primary color measuring photosensors. A keyboard assembly 15 is provided with a number of subject classification and color correction buttons that the operator of the printer may depress to alter the exposure parameters to produce a commercially acceptable print from a negative that requires classification and correction.

The film positioning apparatus is shown in phantom and designated by reference numeral 16 in FIG. 3. The film positioner 16 is positioned adjacent the printer gate aperture 13 and a classification station 17 which is illuminated from below by a classification lamphouse assembly 18 having a lamp 19 positioned adjacent the station 17.

Figure 1:
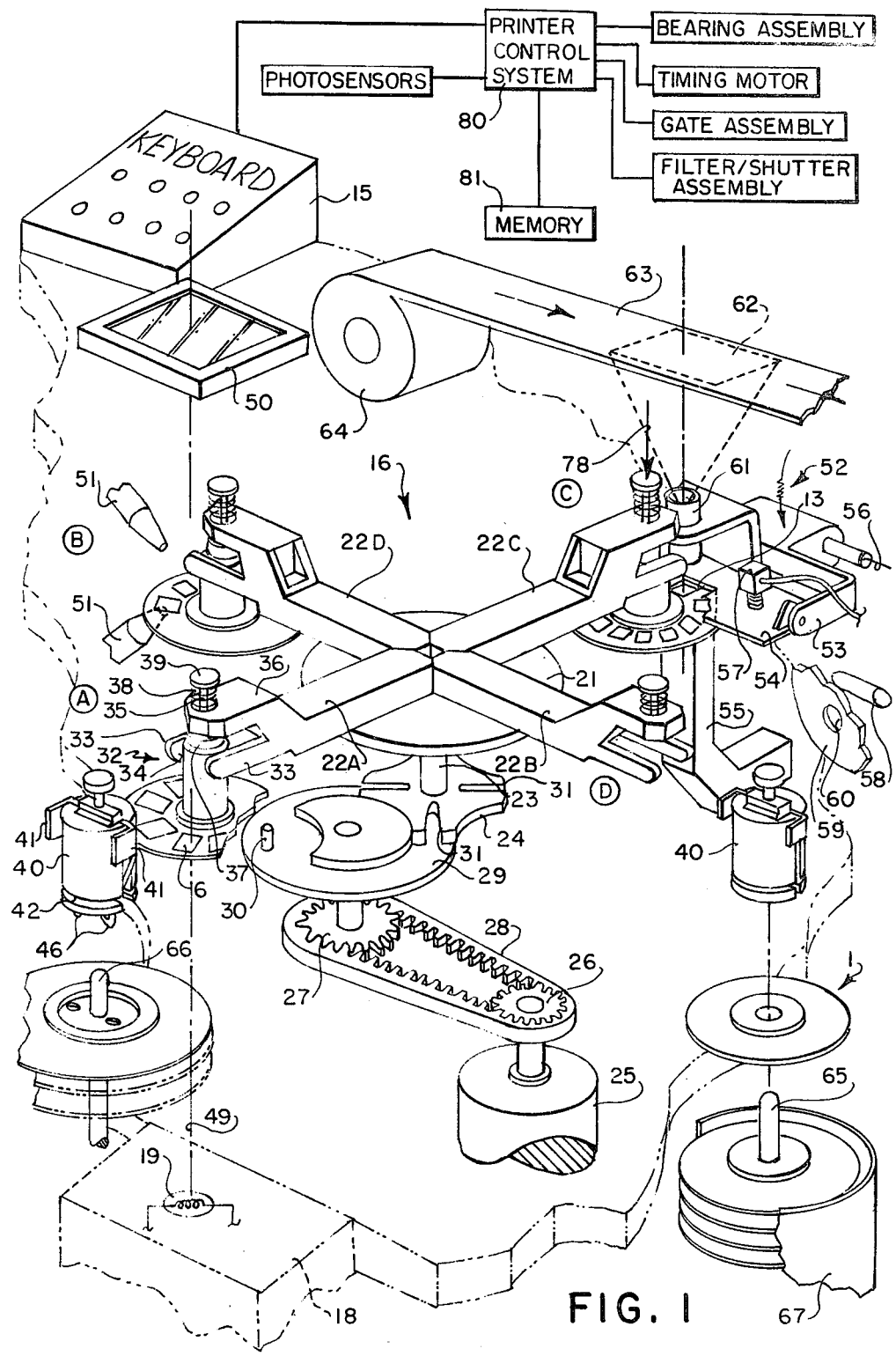
FIG. 1 is a perspective view of apparatus in accordance with the invention embodied in a photographic printer.

Referring now to FIG. 1, the film element positioner 16 includes a mounting plate 21 and four arms 22A–22D extending outwardly from the central portion of the plate 21. A main shaft 23 connects at one end to the center of the plate 21 and at its other end to a Geneva wheel 24. A timing motor 25 is connected by gears 26 and 27 and a timing belt 28 to a Geneva rotor 29. An actuating pin 30 protrudes from the Geneva rotor 29 to mate with slots 31 in the Geneva wheel 24 for moving the latter in increments or steps. In the disclosed embodiment, there are four slots 31 corresponding to the four arms 22A–22D.

A slotted locating member 32 is supported at the end of each arm 22A–22D. Since each member is identical, the locating member positioned on arm 22A will be described in detail with the understanding that similar components are provided on the end of each other arm 22C–D. The member 32 includes two locating fingers 33 defining a slot 34 between them that extends radially inwardly toward the mounting plate 21. A spring loaded plunger 35 is mounted through an aperture in a support 36 that overlies the locating fingers 33. The plunger 35 terminates in a magnetic plate 37 movably located between the support 36 and the locating fingers 33. The magnetic plate 37 is biased against the underside of the support 36 by a spring 38 sandwiched between the topside of the support 36 and an actuating button 39 formed at the top end of the plunger 35.

The slot 34 is disposed to receive a picker mechanism 40 for holding a film unit 1. The picker 40 (as best seen in FIG. 2) includes a pair of hooked fingers 41 that are designed to engage the alignment holes 5 in the hub 2 of the film unit 1. Each finger 41 is spring-biased to snap radially inward toward the center of a captured film unit 1. A plunger 42 is axially biased by a spring 43 to snugly fit against the tips 46 of the fingers 41. An aperture 44 in the center of the picker 40 is formed to receive a spindle 45 (shown in phantom) on which film units of the type described are stacked as shown in FIG. 1. Latching is accomplished by sliding the picker 40 onto the spindle 45 until the hooked fingers penetrate the alignment holes 5 of the top film unit, sandwiching the hub 2 between the tips 46 of the fingers 41 and the plunger 42. The biasing force of spring 43 holds the hub 2 captive against the fingers 41.

The slot 34 is formed in the locating member 32 so as to receive the picker 40 in one orientation only, and thus, the film unit in one orientation also. For this reason the slot has edges designed to receive a key member 47 on the top of picker 40 for one-way insertion (see FIG. 3). The key 47 has an upwardly extending small diameter neck which supports a larger-diameter magnetic lug 48. The lug 48 and the magnetic plate 37 from complementary means for suspending the picker 40 from the support 36; the plate 37 may be brought into magnetic contact with the lug 48 be depressing the actuating button 39 and, when the button 39 is released, the spring 38 biases the magnetically retained picker 40 against the locating fingers 33.

The film positioner has a plurality of work positions corresponding in number to the number of work stations where activities are performed with respect to the film units. In FIG. 1 four such work stations are shown. Station A is the classification station 17 previously described in connection with FIG. 7. Station A is adjacent the classification lamphouse assembly 18 (shown in phantom form in FIG. 1 and spaced from the film unit 1 for ease of illustration) and a classification axis 49.

Light from the lamp 19 illuminates a selected frame 6 and the resultant image light is imaged on a frame viewer 50 where it is visually observed. Operator judgments regarding negative classification are entered via the keyboard assembly 15 into an electronic control system 80 of the printer. In addition, the operator can enter the number of prints desired for each frame. In response to the control system 80, subtractive filters in the lens assembly housing 14 are brought into the exposing beam of light to incrementally terminate exposure in each color.

Station B is spaced ninety degrees from station A and includes apparatus for cleaning dust from the film unit 1. A pair of opposing air nozzles 51 are so located that the positioner 16 moves the film unit frames between them. Depending on the necessity, ionized air may be supplied to the nozzles 51 to assist in removing dust from the film element 1.

Station C is spaced ninety degrees from the position B. At this station the film unit 1 is located adjacent the printing gate aperture 13. A negative gate assembly 52 is provided at station C for enclosing the printer gate aperture 13. The assembly 52 includes a yoke 53 and a pressure plate 54 for positioning the film disk 3 adjacent the top surface of an integrating bar 55. The yoke 53 is pivoted about axis 56 by drive means (not shown) so that the pressure plate 54 may be raised and lowered to allow separate image frames 6 to be positioned in the aperture 13. An air inlet 57 is included in the pressure plate 54 to assist in cooling film disk 3.

The optical system of the printer 10 includes a lamp 58 enclosed within an ellipsoidal mirror 59 (shown in cutaway form) and a cold mirror (not shown). Rays from the lamp 58 pass through an aperture 60 in the mirror 59 and, from there, are reflected and diffused by the integrating bar 55. The diffuse rays emerge at the printer gate aperture 13 and impinge on an image frame 6 positioned in the aperture. Image light emerging from the frame 6 is focused by a lens 61 upon an image plane 62 disposed on the surface of a photographic paper 63. The paper extends between a roll paper supply reel 64 and a take-up reel (not shown) enclosed within the light-tight cabinet 11 illustrated in FIG. 7.

A further station D is spaced yet another ninety degrees from prior station C. Here the picker 40 with attached film unit 1 is removed from the positioner, depositing the film unit on a stacking spindle 65 for later removal in a container 67. The picker 40 is then reused in the apparatus to pick a new film unit from a loading spindle 66 and resume the sequence of operation, beginning again at station A.

The picker 40 is loosely fastened to the positioner 20 by means of magnetic attraction between the magnetic plate 37 and the lug 48. This attraction seats the key member 47 on the picker 40 in the specially slotted edges of the fingers 33, thereby fixedly orienting the picker 40—and the film unit 1—with respect to the positioner. At any of the stations A-D, the picker 40—and the film unit that it holds—may be released from its seated position in relation to the locating member 32 by depressing the button 39 until the key member 47 unseats from the slot 34. It is desirable to rotate the film unit 1 by its hub 2 in some of these positions, notably at station C adjacent the printing gate aperture 13. FIG. 5 illustrates one embodiment of indexer mechanism external to the positioner for rotating the film unit 1 and repeatedly and correctly positioning the frames 6 relative to cooperative apparatus in the printer 10.

As shown in FIG. 5, the cooperative apparatus at station C is the negative gate assembly 52, and more specifically the printing gate aperture 13. A rotatable bearing assembly 68 contains a spindle shaft 69 located adjacent the printer gate aperture 13. The spindle aperture 4 of the film unit 1, shown in phantom in FIG. 5, mates with the spindle shaft 69 on the bearing assembly 68. Further, the tips 46 of the hooked fingers 41, which protrude through the alignment holes 5 of the core 2, mate with a pair of locater holes 70 defined in the assembly 68. The film element 1 is therefore held captive between the picker 40 and the bearing assembly 68. A wheel 71, having a plurality of notches 72 corresponding to the number of frames 6, is attached to the bearing assembly 68. A pair of diametrically opposed blocks 73 contain ball plungers 74 which engage an opposed pair of diametrically opposed notches 72 in the wheel 71 when the balls and notches are aligned. When the bearing assembly 68 is rotated, the balls 74 are depressed by one of a plurality of peripheral segments 75 on the wheel 71, permitting the assembly 68 to rotate relatively freely until another pair of diametrically opposed notches 72 are engaged.

The film unit indexer mechanism, illustrated in FIG. 5, may be duplicated at those stations A-D where incremental rotation of a film unit is necessary to perform the function carried out at a particular station. For example, it may be desirable to rotate the film unit 1 when positioned in the classification position A. The motive means for causing the bearing assembly to rotate may be any suitable drive means, such as the Geneva drive mechanism 76 shown in FIG. 5. The operation of the Geneva drive 76 will be essentially the same as the Geneva drive described in connection with FIG. 1, except that the number of slots in the Geneva wheel will now correspond to the number of frames 6 on a film unit 1.

In operation, the sequence begins when the printing operator takes the picker 40 by its hooked fingers 41 and mates the aperture 44 with the loading spindle 66, sliding the picker 40 along the spindle 66 and pressing it down on the top film unit in the stack. As better shown in FIG. 2, when the picker 40 is greatly pressed against the film element, the tips 46 of the hooked fingers 41 penetrate the alignment holes 5 of the top film unit, separating slightly under bias to permit entry. Simultaneously, the plunger 42 is retracted under bias by pressure against the surface of the hub 2 and the hub 2 is tightly wedged between the finger tips 46 and the plunger 42. The top film unit is then removed from the loading spindle 66.

The picker 40, and its captured film unit 1, is then manually oriented until the key member 47 matches the slot 34 between the locating fingers 33 on the outboard end of film positioner arm 22A. The entire assembly is then slipped into the slot 34 until the small diameter neck of the key 47 is captured between opposing leaf springs 77 mounted in each of the locating fingers 33 (see FIG. 4). In the disclosured embodiment the film disk 3 is so positioned initially on the locating member 32 that an image frame 6 is disposed in the visual classification axis 49.

Before classification proceeds, the picker 40 and its captured film unit 1 is conditioned for rotation by apparatus as illustrated in FIG. 5. The implementation of this apparatus will be described in connection with the station C adjacent the printing gate aperture 13. Therefore, assuming for now that the picker 40 is capable of rotation, the operator examines the first frame 6 by means of the frame viewer 50 and enters appropriate color and-/or density correction by depressing the appropriate buttons on the keyboard assembly 15. The classification data is thereupon entered into an electronic memory 81 to be stored until needed. The picker 40 is next rotated and an adjoining frame 6 is placed in the classification axis 49 for examination by the operator. The operator classifies this negative frame and enters the proper correction into the keyboard assembly 15. Then the picker 40 is again rotated, a new frame classified, and so on. In this manner, each of the frames 6 on the film disk 3 is successively classified.

During the course of classification the correction for each frame 6, and the frame location on the film disk 3, is stored in the electronic memory 81. After all the frames are classified, and presuming all functions occurring at the other positions are completed, the timing motor 25 is energized and increments the timing belt 28 so that the gear 27, and therewith the Geneva rotor 29, make one revolution. During this revolution, the actuating pin 30 engages one of the slots 31 in the Geneva wheel 29 during its forward travel. The wheel 29, and therewith the shaft 23, increments one quarter of a revolution, moving the film positioner 16 by ninety degrees, or one-quarter revolution. The partial revolution of the film positioner 16 advances each arm 22 to the next position. Where the picker 40 and the film unit 1 had previously been adjacent the classification station A, they are now adjacent the station B.

The film cleaning apparatus is located at station B. The pair of nozzles 51 blow air upon the film disk 3 from opposite sides. Rotation at this station is more optional since the compressed air will sweep around to the side of the film disk 3 positioned away from the nozzles 51. However, the picker may be rotated if found necessary or, alternatively, the nozzles 51 may be provided in movable supports for sweeping across the film disk 3. Following completion of cleaning, and of the other operations occurring at the other positions, the Geneva drive illustrated in FIG. 1 is again incremented a quarter revolution until the picker 40, and its captured film unit 1, are positioned adjacent the printing gate aperture 13.

The film disk 3 is initially positioned between the pressure plate 54 and the light output end of the integrating bar 55. The printer gate yoke 53 is raised away from the integrating bar 55 by rotation about the axis 56. This allows space between the pressure plate 54 and the integrating bar 55 such that the film disk 3 may slip between as the positioner 16 is rotated and the film element 1 moves adjacent the printer gate aperture 13. At station C, a machine element—indicated by arrow 78—engages the actuating button 39 and depresses the spring loaded plunger 35. Such a machine element may be, for example, a solenoid-actuated piston. As illustrated by FIG. 3, the depressed plunger 35—shown by phantom lines, forces the magnetic lug 48 downward, unseating the key 47 from the slot 34. The picker 40 is now disengaged from its one-way position of the film positioner arm 22A and free for rotation by the external mechanism illustrated in FIG. 5.

While the top of the picker 40 is being unseated from the locating member 32, the bottom of the picker 40 is seating onto the rotatable bearing assembly 68. In particular, the protruding tips 46 of the hooked fingers 41 enter the locater holes 70 while the aperture 44 seats upon the spindle shaft 69. The rotational drive provided by Geneva mechanism 76 is now in control of the film unit 1.

With the picker 40 in place, the electronic control system 80 commands printing to start. The classification for the first of the frames 6 is retrieved from the electronic memory 81 and inserted into the electronic control system 80 for automatically controlling the length of printing exposure. The printer gate yoke 53 then rotates about the axis 56 so that the pressure plate 54 bears against the film disk 3 with the first of the image frames aligned in the printer gate aperture 13.

The dark shutter then opens, permitting the exposing beam to impinge on the photographic paper 63 along the image plane 62. Each color photosensor begins to measure its respective image color and, in combination with operator classification for each color, triggers a signal to the electronic control system 80 to terminate exposure in that color when sufficient exposure is reached. The control system initiates insertion of the appropriate subtractive filter to terminate the complementary color exposure. When exposure terminates due to insertion of all the subtractive filters and the dark shutter into the printing beam, the Geneva drive 76 is automatically enabled by the electronic control system 80 to begin incrementation of the bearing assembly 68 to the next position where the next frame 6 is positioned in the printer gate aperture 13. At the same time, the photographic paper 63 is incremented by a distance corresponding to one print by conventional mechanism (not shown) within the capability of those skilled in the art. When the next of the frames 6 is in the printer gate aperture 13, the exposure sequence repeats itself as before, the bearing assembly 68 is again rotated, and so on. Automatic sequencing continues until the last of the frames 6 on the film disk 3 is printed.

When the last of the frames 6 on the film disk 3 is printed, the Geneva drive 76 continues to rotate the picker 40 until it is at the same position at which it was unseated from the arm 22A of the film positioner 16. At this stage the key member 47 is again adapted to mate with the slot 34 formed between the locating fingers 33 on the arm 22A. During the course of printing, the machine element 78 had continued to exert a downward bias on the actuating button 39, thereby urging the picker 40 into positive engagement with the bearing assembly 68. Now, with all the frames on the film disk 3 printed, the machine element 78 is conditioned to release and retract to its former position. Due to magnetic attraction between magnetic plate 37 and the lug 48, the picker 40 is raised from its detached position adjacent the assembly 68 to its former position between the locating fingers 33. At this position the picker 40 is again held captive by the positioner 16 and cannot rotate with respect to arm 22 of the positioner.

If the operations occurring at each of the other stations A, B and D are completed, the Geneva rotor 29 again rotates the Geneva wheel 24 through a quarter revolution, carrying the arm 22A and the captured picker 40 to the station D. Unloading or removal of the picker 40 occurs in this position. For example, the picker 40 can be manually removed from between the locating fingers 33. The operator's fingers grasp each of the hooked fingers 41 and, with slight pressure, squeeze the fingers 41 together so the tips 46 of the fingers 41 clear the edge of the alignment holes 5. The film unit 1, assisted by the plunger 42, springs downward and drops into the container 67, mating the picker aperture 44 with the stacking spindle 65 of the container.

With unloading completed, and if the operations occurring at each of the other stations A, B and C are complete, the Geneva rotor 29 is again enabled and rotates the Geneva wheel 24 through another quarter revolution. During this movement, the arm 22A swings back into its initially described station A adjacent the classification axis 49. Thus the cyclical steps of operation are completed with regard to the first film element carried by the arm 22A; now the sequence is ready to continue with regard to the next film element.

During the operations described in connection with arm 22A, other of the arms 22B, C and D will have been positioned to stations A, B, C and D. The operator has been picking up other film units with additional pickers, each identical to the picker 40. These pickers, with their captured film units, have been serially inserted into the locating members 32 of the other arms 22B, C and D. The operator classifies each of the frames on successive film units, entering data through the keyboard 15 into the electronic memory 81, where it is properly identified and retained for recall until the film unit is ready for printing. Each film unit proceeds through the cleaning station B and the printing station C, finally being removed at the unloading position D. Therefore, each operation with regard to one film unit may be occurring while another operation, with regard to another film unit, is also occurring. In particular, various operations may be occurring at various of the positions while the printer automatically prints the frames from one of the film units. Furthermore, the apparatus illustrated by FIG. 5 for rotating the film unit externally of the positioner 16 in the exposure station may be duplicated in any other of the stations for similarly indexing the film unit relative to the positioner at those stations.

The invention has been described in detail with particular reference to preferred embodiments thereof, but it will be understood that variations and modifications can be effected within the spirit and scope of the invention.

What is claimed is:

1. Apparatus for positioning a generally disk-shaped film unit in a plurality of spaced work positions relative to a plurality of work stations respectively, the film unit having a hub and a plurality of image frames disposed circularly around the hub, said apparatus comprising:
   movable means for releasably supporting the film unit;
   means for moving said supporting means to locate the supported film unit at each of the positions;
   means for releasing the film unit from said supporting means in at least one of said positions; and
   means engageable with the hub for moving the released film unit in said one position relative to said supporting means to position selected frames of the released film unit relative a respective one of said work stations.

2. Apparatus in a photographic printer for positioning a generally circular film unit in a plurality of spaced work positions relative to a plurality of work stations including a printing gate located adjacent one of the work positions, the film unit having a central core and a plurality of image areas disposed around the core, said apparatus comprising:
   movable means for supporting a film unit;
   means for moving said supporting means to locate the supported film unit at each of the positions, including the one position adjacent the printing gate; and
   means separate from said supporting means and engageable with said core for indexing the film unit in the one position to position selected frames of the engaged film unit in the printing gate.

3. Apparatus in a photographic printer for positioning a disk-shaped film unit in a plurality of spaced work positions relative to a plurality of printer work stations including a printing gate located adjacent one of the work positions, the film unit having a hub and a plurality of image frames disposed around the hub, said apparatus comprising:
   movable means engageable with said hub for releasably supporting the film unit;
   means for moving said supporting means to position the film unit in each of the plurality of work positions;
   means for releasing the film unit from said supporting means in the one position; and
   means for moving the released film unit relative to said supporting means in the one position to position selected frames of the released film unit in the printing gate.

4. In a photographic printer, film supporting apparatus for positioning a disk-shaped film unit in a plurality of spaced work positions, including an exposure position adjacent to a printing gate, the film unit having a central core and a plurality of image frames disposed around the core, said apparatus comprising:
   movable means for supporting a plurality of film units;
   means on said supporting means for releasably orienting each film unit in a predetermined angular position;
   means for moving said supporting means to sequentially position each film unit in the exposure position;
   means operative in the exposure position for releasing the film unit from said orienting means; and
   indexing means engageable with the core for rotating the released film unit to position selected frames in the printing gate.

5. The apparatus as claimed in claim 4 comprising means for reorienting the released film unit on said orienting means after selected frames of the film unit have been positioned in the printing gate.

6. Film supporting apparatus in a photographic printer for positioning a plurality of disk-shaped film units in a classification position adjacent to a viewing gate and an exposure position adjacent to a printing gate, each film unit having a plurality of image frames, each image frame being viewed for printing exposure correction in the classification position and the correction subsequently being applied when the corresponding frame is exposed in the exposure position, said apparatus comprising:
   a movable member extending adjacent the viewing and printing gates;
   means for releasably supporting at least two film units in spaced relationship on said member;
   means for moving said member to position one film unit in the classification position and the other film unit in the exposure position;
   means for releasing the film unit in the exposure position from said member; and
   means separate from said member for positioning selected frames of the released film unit in the printing gate.

7. The apparatus as claimed in claim 6 comprising:

means for releasing the film unit in the classification position from said member; and means separate from said member for positioning selected frames of the released film unit in the classification position in the viewing gate.

8. Film transport apparatus in a photographic printer for positioning a disk-shaped film unit in a plurality of spaced positions including a first viewing position adjacent to a viewing gate and a second printing position adjacent a printing gate, each film unit having a central hub and a plurality of image frames disposed circularly around the hub, each image frame being viewed for exposure correction in the first position prior to printing exposure in the second position; said apparatus comprising:

transport means for moving the film unit from the first position to the second position; and means separate from said transport means and proximate the second position for engaging the hub and aligning selected frames of the film unit with said printing gate to selectively position the frames for exposure in said printing gate.

9. Film supporting apparatus in a photographic printer for positioning a plurality of disk-shaped film units in a classification position adjacent to a viewing station, a cleaning position adjacent to a cleaning station and an exposure position adjacent to a printing station, each film unit having a plurality of image areas, each image area being viewed for printing exposure correction in the viewing station, cleaned in the cleaning station and exposed in the printing station in accordance with the correction predetermined in the viewing station; said apparatus comprising:

a movable member extending adjacent the viewing, printing and cleaning stations;

means for releasably supporting a plurality of film units in spaced relationship on said member;

means for moving said member to position a film unit in each of the several positions;

means for releasing a film unit from said member relative to at least one of the stations; and means separate from said member for positioning selected images of the released film unit in the station.

10. Film supporting apparatus in a photographic printer for positioning a plurality of disk-shaped film units in a plurality of spaced work positions, including a classification position adjacent to a viewing gate, a cleaning position adjacent to dust removal apparatus, an exposure position adjacent to a printing gate and an unload position adjacent an unloading station, each film unit having a plurality of image areas; each image area being viewed for printing exposure correction in the classification position, having dust removed in the cleaning position, being exposed in the exposure position where the exposure correction is applied to modify exposure; the film unit being removed from the supporting apparatus at the unload station; said apparatus comprising:

movable means for releasably supporting a plurality of film units;

means for moving said supporting means to position a film unit in each of the spaced work positions;

means for releasing two of the film units from said supporting means in the classification and exposure positions, respectively; and means external of said supporting means for positioning selected image areas of one released film unit in the printing gate and selected image areas of the other released film unit in the viewing gate, two other film units being simultaneously disposed for cleaning by the dust removal apparatus and unloading in the unload station.

11. Film supporting apparatus in a photographic printer for positioning a plurality of disk-shaped film units in a classification position adjacent a classification gate and an exposure position adjacent a printing gate, each film unit having a plurality of image areas, each image area being examined for exposure correction in the classification position and being exposed in accordance with the correction in the exposure position, said apparatus comprising:

movable means for supporting the film units;

means included on said supporting means for biasing the disk shaped film units in a predetermined angular orientation relative to the classification and exposure positions;

means for moving said supporting means to position one film unit in the classification position and another film unit in the exposure position;

means for disengaging said means biasing the film unit in the exposure position; and means separate from said supporting means for positioning selected image areas of the unbiased film unit in the printing gate.

* * * * *